United States Patent [19]

Janssens

[11] 3,927,373

[45] Dec. 16, 1975

[54] PAGING SYSTEM

[75] Inventor: Abraham Janssens, Eindhoven, Netherlands

[73] Assignee: U.S. Philips Corporation, New York, N.Y.

[22] Filed: Nov. 20, 1973

[21] Appl. No.: 417,550

[30] Foreign Application Priority Data

Nov. 23, 1972 Netherlands ....................... 7215855

[52] U.S. Cl. ....................... 325/58; 325/184; 331/19

[51] Int. Cl.$^2$ ............................................ H03B 3/08

[58] Field of Search ............... 325/58, 63, 184, 146; 331/18, 19, 74

[56] References Cited

UNITED STATES PATENTS

| | | | |
|---|---|---|---|
| 2,033,237 | 3/1936 | Gannett | 325/58 X |
| 3,600,683 | 8/1971 | Martin | 331/18 X |

*Primary Examiner*—Benedict V. Safourek
*Attorney, Agent, or Firm*—Frank R. Trifari; Henry I. Steckler

[57] ABSTRACT

A paging system for transmitting calls to receivers. The paging signals are modulated on the carriers of a number of transmitters which have the same transmitter frequency. One of the transmitters synchronizes the other transmitters. A transmitter is switched on if a call is to be transmitted, and is switched off after the call has been transmitted. The synchronization unit of a controlled transmitter comprises an auxiliary oscillator having a frequency which lies between the frequency of the synchronization signal and the transmitter frequency. The auxiliary oscillator is synchronized to a multiple of the synchronization frequency, and the transmitter frequency is synchronized to a multiple of the frequency of the auxiliary oscillator.

2 Claims, 2 Drawing Figures

PAGING SYSTEM

The invention relates to a paging system, comprising a plurality of transmitters which are active in the same frequency channel and the carriers of which are modulated by the same information, a transmitter which acts as the controlling transmitter applying a synchronization signal to the other transmitters which act as controlled transmitters, the controlled transmitters being provided with a synchronization unit for synchronizing the transmitter frequency to a multiple of the frequency of the synchronization signal.

Paging systems comprising a number of mutually synchronized transmitters which are active in one and the same frequency channel are generally known.

Among the paging systems which are used for paging persons by utilizing the receivers carried by these persons there are systems in which the transmitters are switched on only during the call. The synchronization system of such a paging system should then be designed such that the transmitters quickly reach the synchronous state after having been switched on.

If a synchronization signal of a frequency which is much lower than the transmission frequency is used for the mutual synchronization of the transmitters, it appears that the speed at which the synchronous state is reached is limited by the tuning range of the transmitters.

The invention has for its object to eliminate this limitation of the synchronization speed, so that controlled crystal oscillators having a small tuning range can be used in the controlled transmitters, with the result that on the one hand the practical requirement is satisfied that adequate frequency accuracy must be ensured also without synchronization, whilst on the other hand the requirement of high synchronization speed is satisfied.

The paging system according to the invention is characterized in that the synchronization unit of a controlled transmitter comprises an auxiliary oscillator, the frequency of which is lower by a factor $n$ than the transmitter frequency and is higher by a factor $m$ than the frequency of the synchronization signal, a frequency control circuit being provided for synchronizing the frequency of the auxiliary oscillator to the $m$-tiple of the frequency of the synchronization signal and a frequency control circuit being provided for synchronizing the transmitter frequency to the $n$-tiple of the frequency of the auxiliary oscillator, $m$ and $n$ being integer numbers larger than one.

The invention and its advantages will be described in detail hereinafter with reference to the figures.

Figure 1:
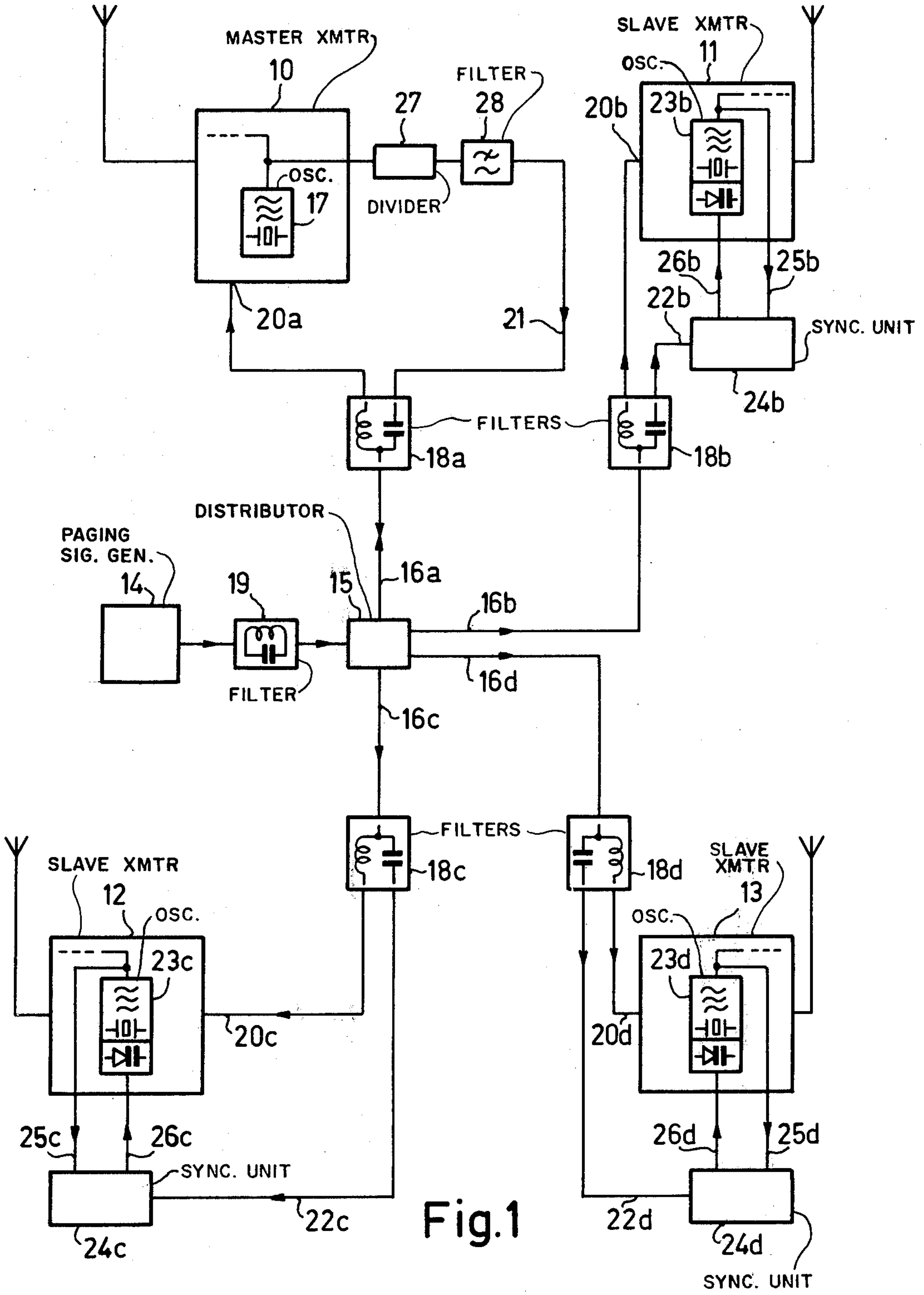
FIG. 1 shows a general block diagram of a paging system according to the invention, comprising one controlling transmitter and three controlled transmitters.

The paging system shown in FIG. 1 comprises a controlling transmitter 10 and the controlled transmitters 11, 12 and 13. The controlling transmitter 10 is referred to as such because a signal which is derived from this transmitter is used for synchronizing the transmitters 11 and 12 and 13 to the transmission frequency of transmitter 10. The controlled transmitters are referred to as such because their transmission frequencies are controlled by transmitter 10.

The paging system furthermore comprises an operating unit 14, comprising means for generating paging signals in reaction to the operation of selection members. The frequencies of these paging signals are situated in the audio range. A distribution unit 15 applies these paging signals to audio transmission lines 16*a*, 16*b*, 16*c* and 16*d*, which apply these signals to the transmitters 10, 11, 12 and 13.

The controlling transmitter 10 comprises a controlling crystal oscillator 17 from which the transmitter carrier is derived and from which a signal is derived for synchronizing the controlled transmitters 11, 12 and 13. This synchronization signal is applied, via audio transmission line 16*a*, to the distribution unit 15, and the latter applies the synchronization signal to the audio transmission lines 16*b*, 16*c* and 16*d*. The frequencies of the paging signals are situated in the lower part of the audio frequency band, and the frequency of the synchronization signal is situated in the higher part of the audio frequency band. The latter frequency amounts, for example, to 6600 Hz. At the ends of the audio transmission lines, the two types of signals are separated by the filters 18*a*, 18*b*, 18*c* and 18*d*. The filter 19 blocks the passage of the synchronization signal to the operation unit 14.

The filter 18*a* applies the paging signal to the modulation input 20*a* of transmitter 10, and receives the synchronization signal from output 21. The filter 18*b* applies the paging signal to the modulation input 20*b* of transmitter 11, and applies the synchronization signal to the synchronization input 22*b*. The transmitter 11 comprises a voltage-controlled crystal oscillator 23*b* from which the transmitter carrier is derived. This oscillator is coupled to the synchronization unit 24*b* (input 25*b* and output 26*b*), comprising the input 22*b*. Part of the oscillator signal is applied to input 25*b*. The synchronization unit 24*b* supplies output 26*b* with a control signal which synchronizes the frequency of oscillator 23*b*.

Part of the signal of oscillator 17 is branched off in transmitter 10 and is applied to a frequency divider 27. The output signal of the frequency divider is applied, via a filter 28, to the output 21. The dividing factor of the frequency divider 17 is determined in relation to the frequency of the oscillator 17 such that the frequency of the synchronization signal is situated in the upper part of the audio frequency band. For a frequency of 30 MHz of oscillator 17, a dividing factor of 8000 is a suitable value. The synchronization signal then has a frequency of 5000 Hz. In practice the aim will be to compose the dividing factor, if possible, of only the factors 2, in order that a simple series connection of two-dividers can be used. For the frequency band with the central frequency of 40680 kHz which is prescribed in practice for paging systems (in Germany), a dividing factor of $3.2^{11}$ is a suitable value. Using this value, the synchronization signal will have a frequency of approximately 6600 Hz. For the other permitted frequency bands, having the central frequencies of 27120 kHz and 13560 kHz, the dividing factors $2^{12}$ and $2^{11}$ can be used, so that a frequency of approximately 600 Hz is again obtained after division. For the 13560 kHz band the frequency divider 27 is then composed of the series connection of eleven two-dividers, of twelve two-dividers for the 27120 kHz band, and of eleven two-dividers and one three-divider for the 40680 kHz band.

The filter 28 blocks the higher harmonics of the output signal of frequency divider 27, with the result that via the audio transmission lines a synchronization signal is transmitted which does not contain components which are situated outside the audio frequency band. It is thus prevented that neighbouring audio circuits are disturbed, so that normal telephone lines can be used for the transmission of the paging signals and synchronization signals.

The transmitters of the paging system are switched on only if a call is to be transmitted. The switching on of the transmitters is effected by means of a signal which is generated by the operating unit 14 and which is applied to the audio transmission lines 16*a*, 16*b*, 16*c* and 16*d* simultaneously with the paging signal. This signal can be formed, for example, by a direct current. This signal is detected in the transmitters and is subsequently used for actuating the transmitters.

The oscillators in the transmitters are normally switched off. This is because a transmitter which is out of operation may produce only a very small amount of radiation. It is difficult to meet the practical requirements if only the output stages or the output stages and the control stages are switched off.

Due to the switching off of the oscillators, severe requirements are imposed as regards the synchronization, particularly as regards the time which expires between the instant at which the switch-on signal is received and the instant at which the controlled transmitter is synchronized. This time will be referred to hereinafter as "pull-in time".

This pull-in time must be small with respect to the duration of the signal elements of the paging signal. A commonly used value range for the duration of the signal elements is 100–200 ms, with the result that the pull-in time may amount to at the most a few tens of ms. An important factor which influences the pull-in time is the tuning range of the voltage-controlled oscillators 23*b*, 23*c* and 23*d*. These oscillators are crystal oscillators in order to ensure that the transmitters have at least approximately the correct frequency also if the synchronization fails. It is difficult to tune a crystal oscillator of this kind over a large frequency range. Furthermore, the frequency range through which a transmitter of a paging system may be tuned is limited by practical requirements and may amount to only a few thousands of Hz in given cases. By way of illustration, it can be stated that for a crystal oscillator of 40 MHz a relative tuning range of $\pm 50.10^{-6}$ ($\pm$ 2000 Hz) is a value which can be realized by simple means and which is permissible in practical paging systems.

If the synchronization signal has a frequency of 5000 Hz (dividing factor 8000) and if the frequency of the voltage-controlled crystal oscillator of 40 MHz is divided by 8000, the divided frequency has a tuning range of ±¼ Hz. This means that the signal which is obtained by division of the oscillator frequency has a phase which cannot vary faster than 90°/s. The pull-in time will then be in the order of seconds.

Figure 2:
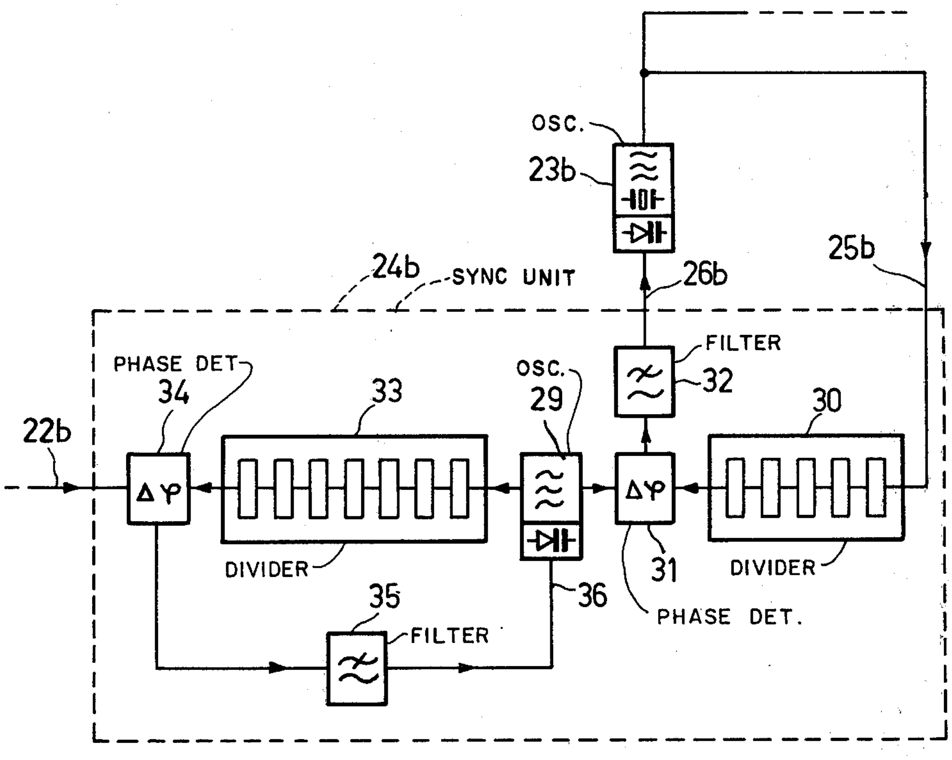
FIG. 2 is a block diagram of the synchronization unit of a controlled transmitter.

According to the invention, the synchronization unit of a controlled transmitter is constructed as shown in FIG. 2 for the synchronization unit 24*b*.

The synchronization unit 24*b* comprises a voltage-controlled auxiliary oscillator 29. This auxiliary oscillator has a large tuning range of, for example, $\pm 2.10^{-2}$. By way of example, a system will be considered in which the oscillator 23*b* of transmitter 11 has a frequency of 40 MHz and the dividing factor is 8000. The frequency of auxiliary oscillator 29 amounts to 800 kHz.

The frequency of oscillator 23*b* is divided to 800 kHz by the frequency divider 30. The dividing factor is 50. The output signal of frequency divider 30 is applied to phase detector 31 which also receives a part of the signal of oscillator 29. The output signal of phase detector 31 is applied to the output 26*b* via the filter 32. The signal on output 26*b* controls the frequency of oscillator 23*b*.

The frequency of auxiliary oscillator 29 is divided to a value of 5000 Hz by frequency divider 33. The dividing factor amounts to 160. The output signal of frequency divider 33 is applied to phase detector 34 which also receives the synchronization signal originating from input 22*b*. The output signal of phase detector 34 is applied, via filter 35, to the input 36 of auxiliary oscillator 29. The signal on input 36 controls the frequency of the auxiliary oscillator.

Upon reception of a synchronization signal on input 22*b*, phase detector 34 will supply a signal which is dependent of the phase difference between the synchronization signal and the output signal of frequency divider 33. This signal controls the frequency of oscillator 29 such that, after a short pull-in time, the frequency of oscillator 29 is accurately equal to 160 times the frequency of the synchronization signal. The relative tuning range of oscillator 29 is $\pm 2.10^{-2}$. The absolute tuning range is ± 16 kHz. After division by the factor 160 (by frequency divider 33), an absolute tuning range of ± 100 Hz remains. The phase of the output signal of frequency divider 33 can then be changed at a speed of 360°/10 ms, with the result that the pull-in time is in the order of 10 ms.

The filter 35 is a low-pass filter which serves to suppress the jitter components of the output signal of phase detector 34. If the cut-off frequency of filter 35 is chosen to be very low, the pull-in time could be reduced. Therefore, the limit frequency is chosen to be equal to or slightly lower than the maximum frequency (100 Hz) over which the output signal of frequency divider 33 may be detuned. This maximum frequency is also the maximum beat frequency which can occur on the output of phase detector 34. The filter 35 is preferably proportioned such that a signal having the maximum beat frequency is still allowed to pass without or with only a slight attenuation.

The second frequency control circuit comprising the frequency divider 30, the phase detector 31 and the filter 32 operates in principle in the same manner as the described first control circuit.

The relative tuning range of oscillator 23*b* is $\pm$ $50.10^{-6}$. The absolute tuning range is ± 2000 Hz. After division by the factor 50 (by frequency divider 30), an absolute tuning range of ± 40 Hz remains. The phase of the output signal of frequency divider 30 can then change at a speed of 360°/25 ms, with the result that the pull-in time is in the order of 25 ms. The limit frequency of filter 32 is chosen to be equal to 40 Hz.

In any case, the pull-in time of the first and the second frequency control circuit together is not larger than the sum of the pull-in times of the control circuits separately, i.e. not larger than approximately 35 ms. The actual pull-in time will be less than 35 ms. because the control processes partly coincide, i.e. during the controlling of the frequency of auxiliary oscillator 29, the frequency of oscillator 23*b* will already be controlled.

A pull-in time which is smaller than 35 ms already properly satisfies the requirements imposed on a paging system. The pull-in time can be further reduced by using more than two frequency control circuits in series.

As already stated, the dividing factors $3.2^{11}$ and $2^{12}$ and $2^{11}$ will preferably be used for the frequency bands of 40680 kHz, 27120 kHz and 13560 kHz. In these cases, the frequency divider 35 can have the dividing factor $2^7$, and the frequency divider 30 the dividing factor $3.2^4$; $2^5$ and $2^4$, respectively. As is shown in FIG. 2, the frequency divider 33 then consists of a series of seven two-dividers. For the highest frequency band, the frequency divider 30 then consists of a series of one three-divider and four two-dividers; for the central frequency band it consists of a series of five two-dividers, whilst for the lowest frequency band it consists of a series of four two-dividers.

What is claimed is:

1. A paging system comprising a plurality of controlled transmitters each having an main oscillator means for generating carriers in the same frequency channel, the carriers being modulated by the same information, a controlling transmitter coupled to apply a synchronization signal to the controlled transmitters, the controlled transmitters each having a synchronization unit means for synchronizing the transmitter frequency to a multiple of the frequency of the synchronization signal, the synchronization unit of each of said controlled transmitters comprises an auxiliary oscillator, the frequency of which is lower by a factor *n* than the transmitter main oscillator frequency and is higher by a factor *m* than the frequency of the synchronization signal, a first frequency control circuit means coupled to said auxiliary oscillator for synchronizing the frequency of the auxiliary oscillator to the *m*-tiple of the frequency of the synchronization signal, said first control circuit comprising a first frequency divider which has the dividing factor *m* coupled to the output of said auxiliary oscillator, a first phase detector having a first input means for receiving the synchronization signal and a second input coupled to the first frequency divider output, and a first low pass filter coupled between the output of the phase detector and a control input of the auxiliary oscillator, and a second frequency control circuit means cascaded and independent with respect to said first control circuit means and coupled to said main oscillator for synchronizing the transmitter main oscillator frequency to the *n*-tiple of the frequency of the auxiliary oscillator, said second control circuit comprising a second frequency divider having the dividing factor *n* coupled to said main oscillator, a second phase detector which is coupled to the auxiliary oscillator and to said second divider, and a second low pass filter coupled between the output of the second phase detector and a frequency control input of the transmitter main oscillator, *m* and *n* being integer numbers larger than one.

2. A paging system as claimed in claim 1, further comprising audio transmission lines coupled between the controlling transmitter and the controlled transmitters for the transmission of the synchronization signal.

* * * * *